(12) United States Patent
Tanaka et al.

(10) Patent No.: US 6,188,521 B1
(45) Date of Patent: Feb. 13, 2001

(54) IMAGE DISPLAYING APPARATUS HAVING MAGNIFICATION-CHANGING SYSTEM

(75) Inventors: Tsunefumi Tanaka; Sadahiko Tsuji, both of Yokohama; Hideki Morishima; Norihiro Nanba, both of Kawasaki; Takeshi Akiyama, Yokohama, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/450,787

(22) Filed: May 25, 1995

(30) Foreign Application Priority Data

May 27, 1994 (JP) .................................................. 6-137949

(51) Int. Cl.⁷ ............................. G02B 27/14; G02B 23/00
(52) U.S. Cl. ........................... 359/631; 359/630; 359/420
(58) Field of Search .................................... 359/419, 420, 359/421, 422, 423, 424, 630, 631

(56) References Cited

U.S. PATENT DOCUMENTS 4,969,714 * 11/1990 Fournier, Jr. et al. ................ 353/174
5,587,836 * 12/1996 Takahashi et al. .................... 359/630

* cited by examiner

Primary Examiner—Georgia Epps
Assistant Examiner—David N. Spector
(74) Attorney, Agent, or Firm—Morgan & Finnegan, L.L.P.

(57) ABSTRACT

The present invention relates to an image displaying apparatus comprising an image displaying device for radiating light to display an image, a first optical system for forming the image on a primary image plane, which has a magnification-changing portion for changing an image magnification of the image and a second optical system for guiding light from the primary image plane to the pupil of an observer in order to enable the observer to observe an enlarged, virtual image of the image formed on the primary image plane.

10 Claims, 17 Drawing Sheets

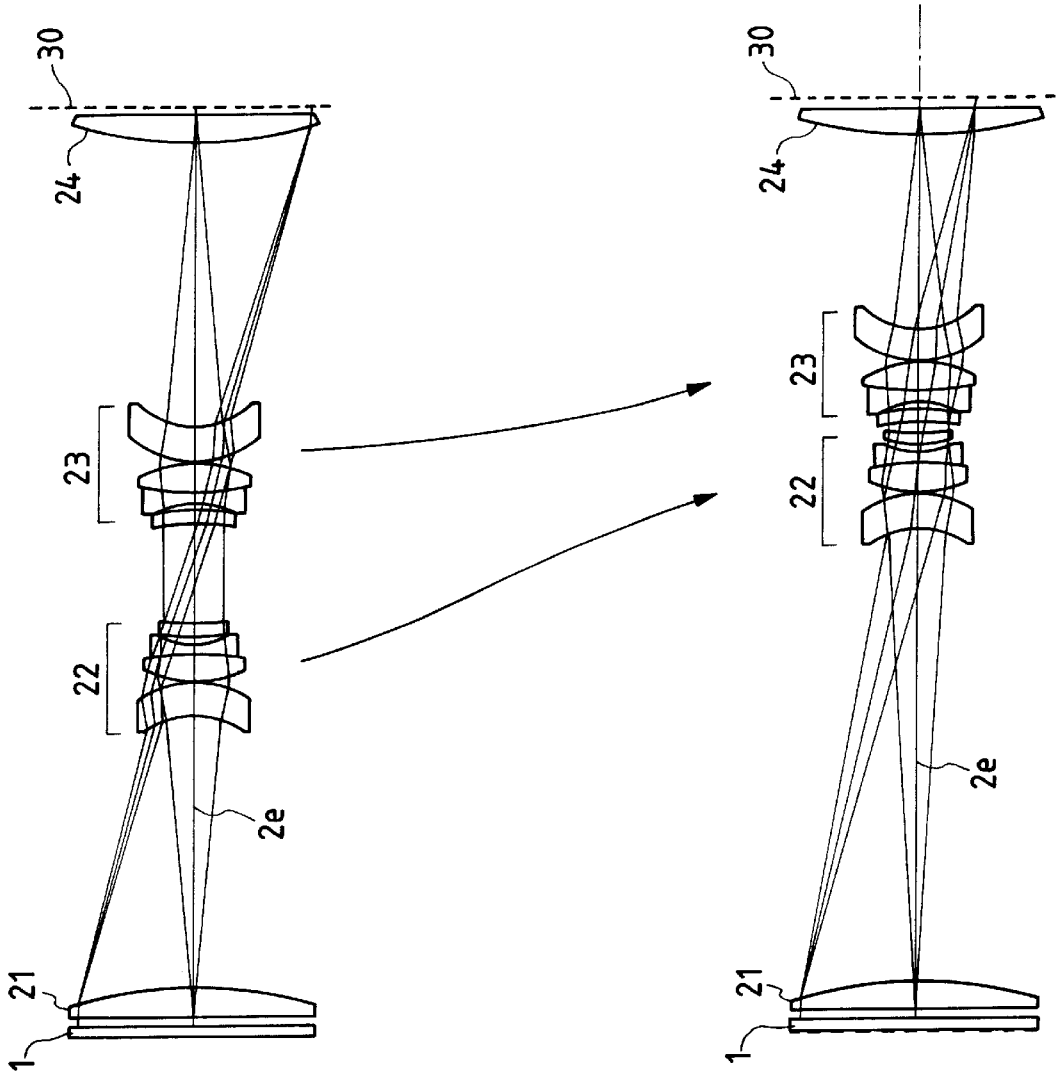

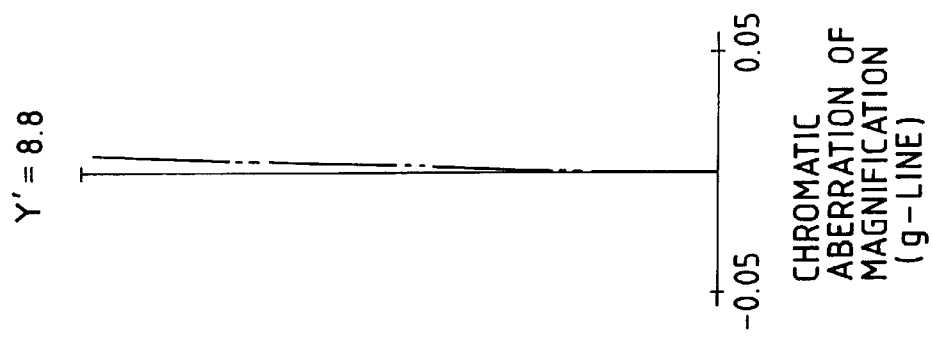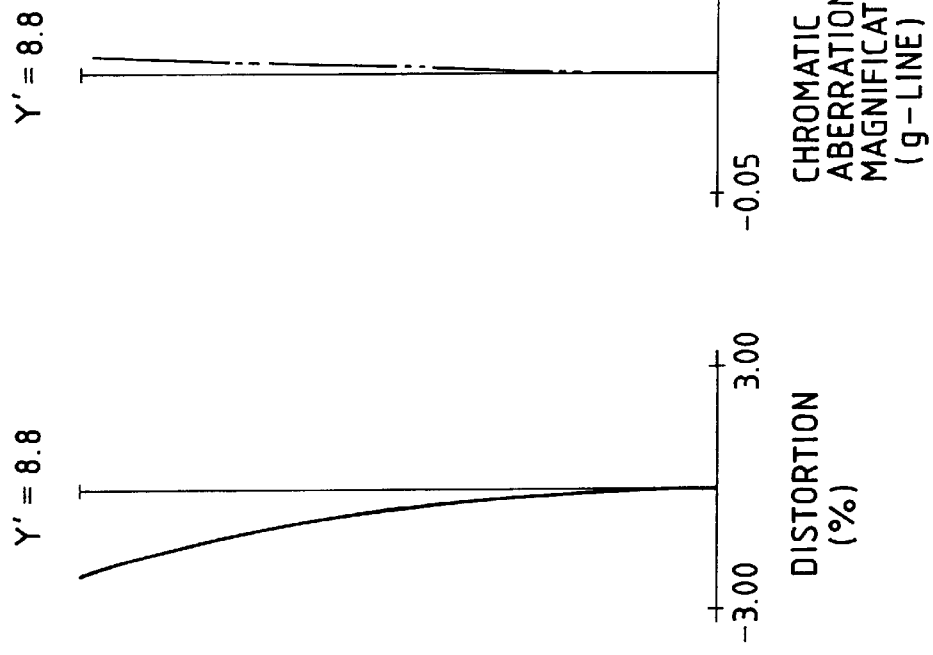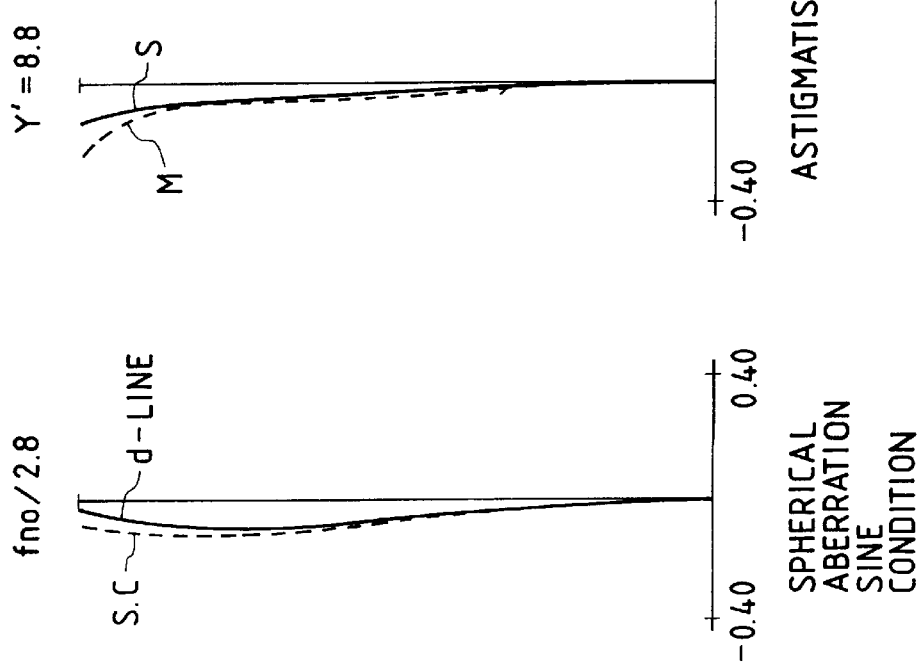

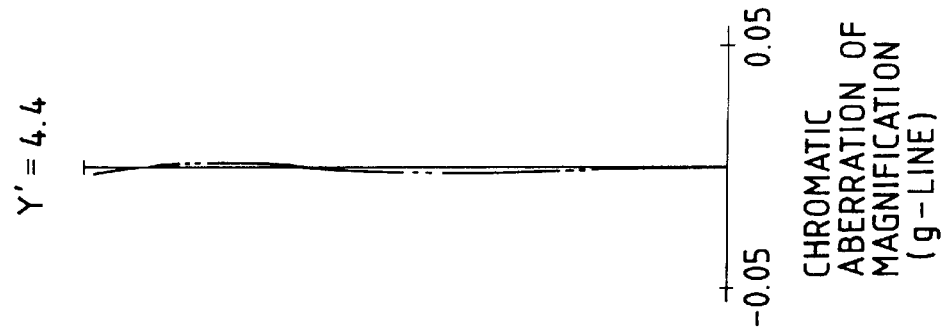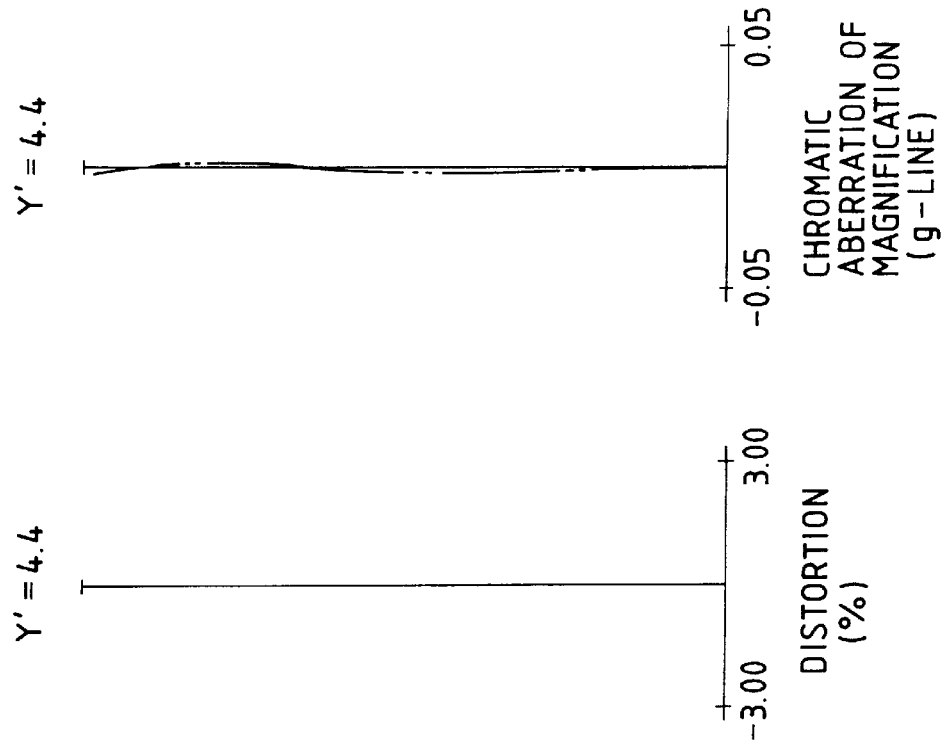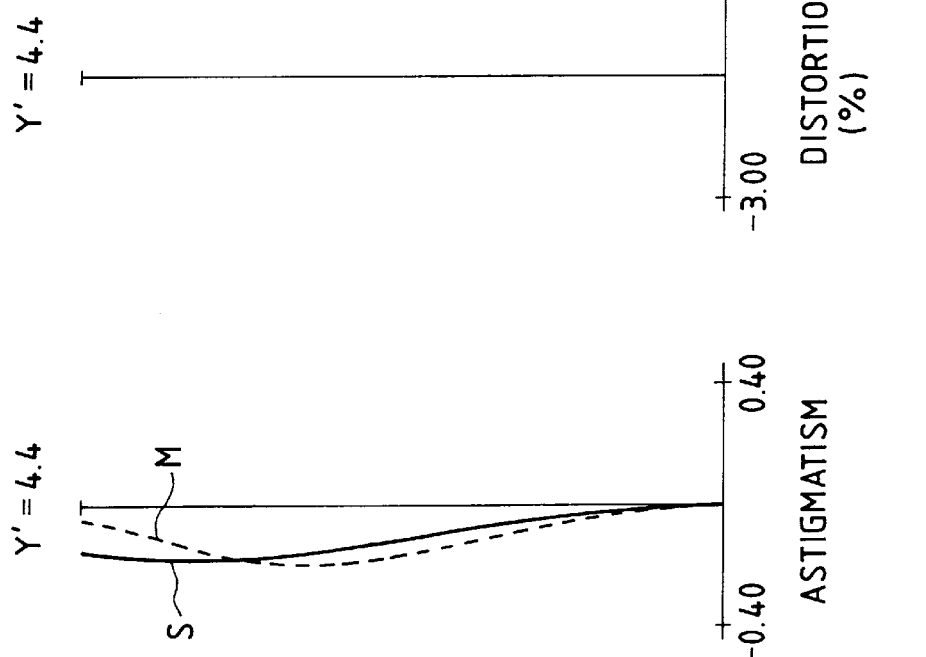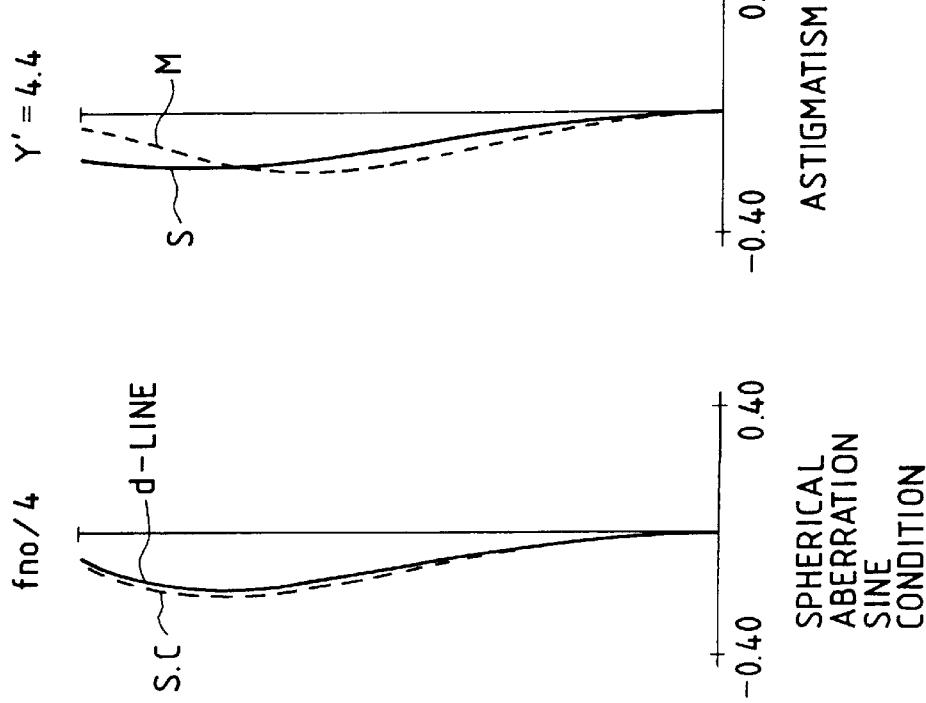

IMAGE FOR LEFT EYE

IMAGE FOR RIGHT EYE

IMAGE FOR BOTH EYES

IMAGE DISPLAYING APPARATUS HAVING MAGNIFICATION-CHANGING SYSTEM

BACKGROUND OF THE INVENTION

1. Field of the Invention

The present invention relates to an image displaying apparatus to be mounted on the head for an observer to observe image information displayed on an image display device, and more particularly to an image displaying apparatus arranged to guide a light beam based on the image information displayed on the image display device, such as a liquid crystal image display device, provided in the apparatus, to the observer's eyeball, thereby permitting the observer to observe the image information as an enlarged, virtual image.

2. Related Background Art

A large-area monitor apparatus is necessary for forming a large-screen image with presence in conventional television displaying apparatus. Such large-screen monitors had such problems that they were expensive, that the apparatus per se became large in scale, and that a wide space was necessary for appreciation.

Methods for decreasing the size of these displaying apparatus have been proposed to solve such problems, for example in Japanese Laid-open Patent Applications No. 62-127826 and No. 1-133479. In these applications, there are proposed the apparatus arranged to enlarge an image on a small-area image display device and to display an enlarged, virtual image equivalent to a large-screen image so as to permit the observer to observe it. Also, National Publication of Translated Version of Japanese Patent Application No. 4-501637 describes a proposal of stereo video image display apparatus arranged in such a manner that two stereoscopically recorded images are displayed on respective image display devices corresponding to the left and right eyes, that enlarged, virtual images of those displayed images through optical systems are superimposed ahead the observer by a small mirror in front of the observer's pupils, and that the external field can be visually recognized around the displayed, virtual images.

Besides, Japanese Laid-open Patent Applications No. 6-38144 and No. 6-43392 also proposed the miniaturized, displaying apparatus.

The apparatus of this type have an advantage that the observer can observe an image while moving or doing another work, in addition to an advantage that the apparatus can show a large-screen image as being compact.

For the displaying apparatus arranged for double observation of a scene in the external field and the enlarged, virtual image of image information displayed on the image display device (hereinafter referred to as a virtual display image), there are two ways for observing the images. One of them is a case for observing or visually recognizing only either one of the scene in the external field and the virtual display image as selectively selected. In this case, the virtual display image is largely displayed in the field which the observer is visually recognizing, and visual recognition may be made while changing over the observing field between the scene in the external field and the virtual display image by an on-off changeover switch and means for shutting off the scene in the external field.

The second case is a case of superimposed observation in which the virtual display image is superimposed on the scene. For example, the second case includes a case in which a variety of meters and symbols for pilotage are superimposed in a pilot field of airplane, a case for evaluating an effect of an object to be set in a scene by superimposing a building or sculpture in a scene on the ground, or a case for appreciating a video image in a size not to cause a trouble in observation of scene, while mainly observing the scene in the external field.

For the displaying apparatus for superimposed observation of the virtual display image superimposed on the scene in the external field, when the size of virtual display image is desired to change or when the position of virtual display image is also desired to change, it is conceivable that the region utilized for display on a display surface of the image display device is demagnified with necessity, thereby decreasing the size of the virtual display image. In this case, a decrease in the number of pixels is extreme in the image display device operating for display of image information, resulting in unsatisfactory image quality.

In case of the apparatus as proposed in Japanese Laid-open Patent Applications No. 6-38144 and No. 6-43392, a moving amount of moving portions becomes very large in order to attain a large magnification change, which is not preferred for the display apparatus to be mounted on the head.

SUMMARY OF THE INVENTION

An object of the present invention is to provide displaying apparatus for superimposed observation of an enlarged, virtual image (virtual display image) of image information displayed on an image display device, in a scene in the external field, which are high-resolution image displaying apparatus or multi-eye image displaying apparatus, arranged in such a manner that when the observer desires preponderantly to observe the virtual display image, the size of virtual display image is increased to a large-screen size to permit the observer to visually recognize it preponderantly, and that when the observer desires preponderantly to observe the scene in the external field, the size of virtual display image is decreased and, further if necessary, a display region thereof is moved to facilitate preponderant, visual recognition of the scene in the external field.

A certain form of the image displaying apparatus of the present invention for achieving the above object is characterized by comprising: image displaying means for radiating light to display an image; a first optical system for forming the image on a primary image plane, which has a magnification-changing portion for changing an image magnification of the image; and a second optical system for guiding light from the primary image plane to the pupil of an observer in order to enable the observer to observe an enlarged, virtual image of the image formed on the primary image plane.

A preferred form of the magnification-changing portion in the first optical system is characterized by having at least two magnification-changing partial systems relatively moving to each other on the optical axis of the first optical system.

A preferred form of the magnification-changing portion in the first optical system is characterized by having a field lens located in front of the image displaying means.

A preferred form of the first and second optical systems is characterized in that an exit pupil of the first optical system is approximately coincident with an entrance pupil of the second optical system.

A preferred form of the second optical system is characterized by having a beam combiner and in that the observer observes the enlarged, virtual image and an image of an external field in a superimposed manner through the beam combiner.

A certain form of the image displaying apparatus of the present invention is a multi-eye type image displaying apparatus characterized by comprising:

two displaying devices for the left eye and the right eye of an observer, each having image displaying means for radiating light to display an image, a first optical system for forming the image on a primary image plane, which has a magnification-changing portion for changing an image magnification of the image, and a second optical system for guiding light from the primary image plane to the pupil of the observer in order to enable the observer to observe an enlarged, virtual image of the image formed on the primary image plane.

A preferred form of the each magnification-changing portion in the first optical system for the left eye or the right eye is characterized by having at least two magnification-changing partial systems relatively moving to each other on the optical axis of each optical system and means for moving the respective magnification-changing partial systems and it is further characterized in that the moving means move the magnification-changing portions in the first optical systems for the left eye and the right eye by a same amount.

A preferred form of the images displayed by the image displaying means for the left eye and the right-eye is characterized by having parallax between them.

A preferred form of the optical axes of the first optical systems is characterized by each deviating from the centers of the images.

A preferred form of the optical axes of the first optical systems is characterized by each deviating from the optical axes of the second optical systems.

A preferred form of deviations of the optical axes of the first optical systems for the left eye and the right eye from the centers of the images is characterized in that the deviations are horizontal, are opposite to each other in direction, and are same in amount.

A preferred form of the second optical systems is characterized by having a beam combiner and in that the observer observes the enlarged, virtual images and an image of an external field in a superimposed manner through the beam combiner.

The image displaying apparatus of the present invention will be described with some embodiments to follow.

BRIEF DESCRIPTION OF THE DRAWINGS

FIGS. 2A and 2B are optical system cross sections of a first optical system 2 in Embodiment 1, wherein FIG. 2A shows image formation at magnification of 1 and FIG. 2B image formation at magnification of 0.5;

FIGS. 3A, 3B, 3C, and 3D are aberration diagrams of the first optical system (for image formation at magnification of 0.5);

FIGS. 4A, 4B, 4C, and 4D are aberration diagrams of the first optical system (for image formation at magnification of 1);

FIGS. 5A and 5B are conceptual drawings of images visually recognized by the observer in Embodiment 1, wherein FIG. 5A shows an image in case of the image formation at magnification of 1 and FIG. 5B an image in case of the image formation at magnification of 0.5;

FIGS. 9A and 9B are explanatory drawings of 3D image in Embodiment 4 (for image formation at magnification of 1), wherein FIG. 9A shows images displayed for the left and right eyes and FIG. 9B a binocular image;

FIGS. 10A and 10B are explanatory drawings of 3D image in Embodiment 4 (for image formation at magnification of 0.5), wherein FIG. 10A shows images displayed for the left and right eyes and FIG. 10B a binocular image;

FIGS. 17A and 17B are cross sections of the first optical system in Embodiment 5, wherein FIG. 17A shows image formation at magnification of 1 and FIG. 17B image formation at magnification of 0.5;

FIGS. 18A and 18B are explanatory drawings of image in Embodiment 6 of the present invention, wherein FIG. 18A shows images displayed for the left and right eyes and FIG. 18B a binocular image;

FIGS. 19A and 19B are explanatory drawings of image in Embodiment 6 of the present invention, wherein FIG. 19A shows images displayed for the left and right eyes and FIG. 19B a binocular image; and FIGS. 20A and 20B are explanatory drawings of image in Embodiment 7 of the present invention (for image formation at magnification of 0.5), wherein FIG. 20A shows images displayed for the left and right eyes and FIG. 20B a binocular image.

DETAILED DESCRIPTION OF THE PREFERRED EMBODIMENTS

Figure 1:
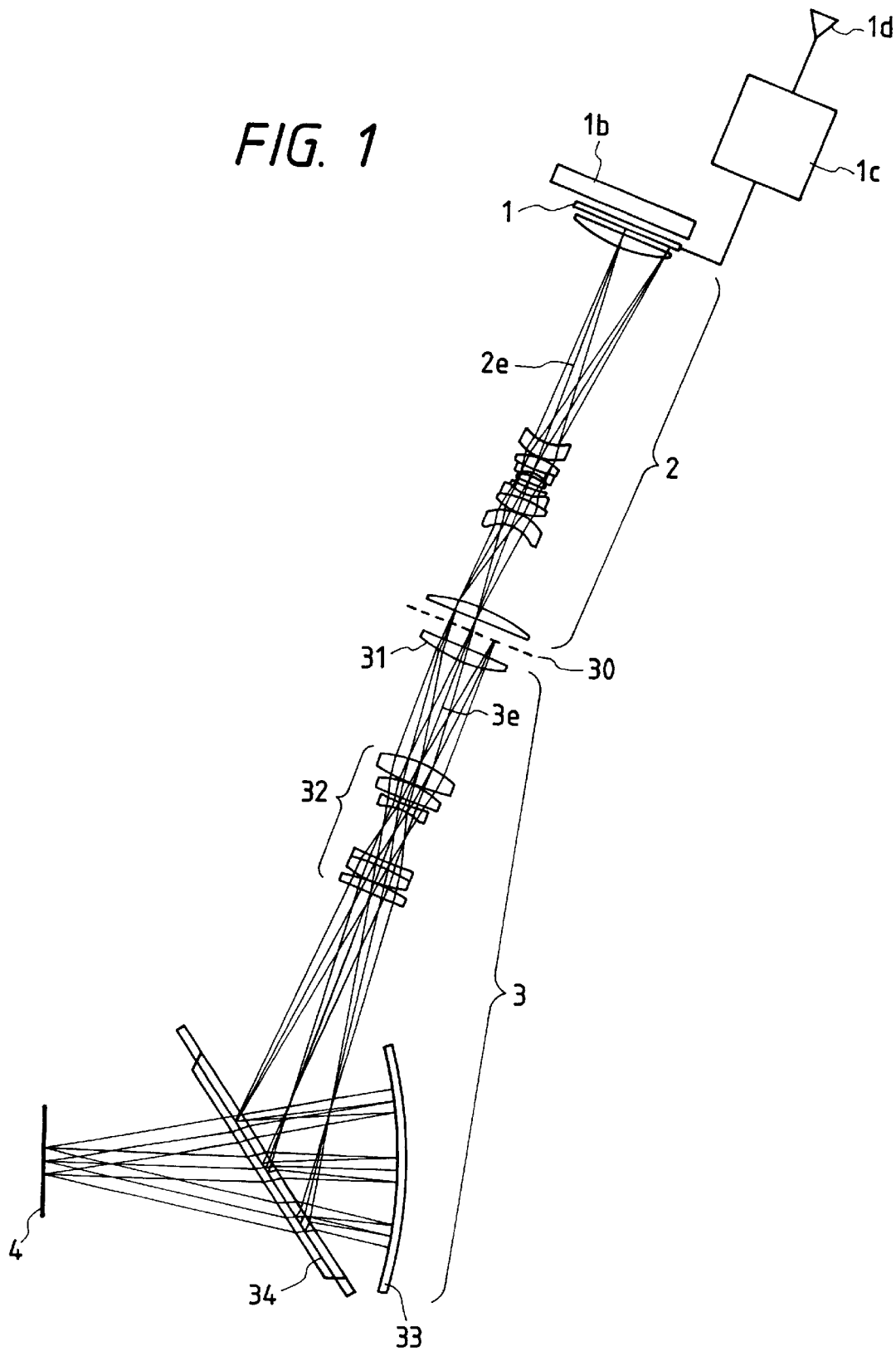
FIG. 1 is a schematic drawing to show an optical system in Embodiment 1 of the present invention.

FIG. 1 is a schematic drawing to show an optical system in Embodiment 1 of the present invention. Reference numeral 1 designates an image display device, which is a transmission type liquid crystal display device in the present embodiment. Symbol 1b denotes an illuminating means (backlight), which illuminates the image display device 1. Symbol 1d represents an input terminal and 1c a liquid crystal driving means, as arranged in such a manner that the liquid crystal driving means 1c displays a video signal taken in through the input terminal 1d, as image information on the image display device 1. Numeral 2 designates a first optical system, which has a magnification-changing optical system (magnification-changing portion) 2a having a magnification-changing function, a first field lens 21 disposed in front of the image display device 1, and a second field lens 24 disposed in the vicinity of a primary image plane 30. The first optical system 2 primarily forms an image of the image information displayed on the image display device 1 at various magnifications on the primary image plane 30. Symbol 2e is the optical axis of the first optical system 2. Numeral 3 denotes a second optical system, which forms an enlarged, virtual image of the image of image information formed on the primary image plane 30 ahead the observer and which guides light from the primarily formed image to the pupil 4 of the observer. Symbol 3e denotes the optical axis of the second optical system 3.

The second optical system 3 has a field lens 31 provided in the vicinity of the primary image plane 30, a relay lens 32 for re-imaging the image of image information formed on the primary image plane 30 at a predetermined magnification, and a semitransparent, curved mirror 33 and a semitransparent, plane mirror (half mirror) 34 for forming a virtual display image ahead the observer from the image through the relay lens 32. In the present embodiment the field lens 31 and relay lens 32 compose a relay optical system. Further, the curved mirror 33 and plane mirror 34 compose an eyepiece optical system. Light beams from the primary image plane 30 pass through the field lens 31 and relay lens 32, and thereafter are reflected by the plane mirror 34 toward the curved mirror 33. Then part of the light beams are reflected and collimated by the curved mirror 33, and the reflected beams pass through the plane mirror 34 to enter the observer's pupil 4. Further, light from the external field passes through the curved mirror 33 and plane mirror 34 to reach the observer's pupil 4. The curved mirror 34 is a beam combiner for superimposing the enlarged, virtual image of image information on a scene in the external field. By the above arrangement, the observer observes the enlarged, virtual image (virtual display image) of the image information displayed on the image display device 1 in addition to the scene in the external field.

FIGS. 2A and 2B are optical system cross sections of the first optical system 2 in Embodiment 1 of FIG. 1. The first optical system 2 has the magnification-changing optical system (magnification-changing portion) 2a which can change the image magnification in the range of 1 to 0.5. FIG. 2A shows a case in which the image magnification of the first optical system 2 is 1, while FIG. 2B shows a case in which the image magnification of the first optical system 2 is 0.5. In either case, the image information on the image display device 1 is primarily formed at a magnification of 1 or 0.5 on the primary image plane 30. In the drawings, the first field lens 21 has a function to take light beams the principal rays of which are nearly perpendicular to the image display surface, out of light beams emergent from the image display device 1, into the magnification-changing optical system 2a, thereby obtaining uniform contrast and modulation effect over the entire screen. Numerals 22 and 23 designate magnification-changing partial systems, which move in conjunction with each other on the optical axis to change the image magnification while maintaining constant the object-to-image distance, that is, an image distance from the image display device 1 to the primary image plane 30. The second field lens 24 effects telecentric image formation in the present embodiment, that is, sets principal rays incident on the primary image plane 30 as to be nearly parallel to the optical axis at any image height. In cooperation with the field lens 21 in the first optical system 2, the field lens 31 in the second optical system 3 makes, the entrance pupil of the second optical system coincident with the exit pupil of the first optical system, thereby effectively utilizing the light beams from the display device 1.

When the image display device 1 is a transmission-type liquid crystal display device, the first field lens 21 is preferably set in the vicinity of the image display device 1, because an image without luminance variations of screen can be obtained by taking the light beams perpendicular to the image display surface into the optical system. Also, the second field lens 24 is preferably provided in order to enhance the utility factor of light beams guided into the second optical system 3.

Next shown is an numerical example of the first optical system in the present embodiment. In the numerical example, Ri represents a radius of curvature of the i-th lens surface numbered from the image display device 1 side, Di a thickness or aerial gap of the i-th lens numbered from the image display device 1 side, and Ni and vi refractive index and Abbe number, respectively, of a glass forming the i-th lens numbered from the image display device 1 side.

First optical system of the present embodiment

| | | | |
|---|---|---|---|
| R1 = ∞ | D1 = 1.92 | N1 = 1.60311 | v1 = 60.7 |
| R2 = −28.949 | D2 = variable | | |
| R3 = −5.368 | D3 = 2.40 | N2 = 1.64769 | v2 = 33.8 |
| R4 = −6.268 | D4 = 0.10 | | |
| R5 = 7.847 | D5 = 1.96 | N3 = 1.77250 | v3 = 49.6 |
| R6 = −21.342 | D6 = 0.16 | | |
| R7 = −15.623 | D7 = 0.67 | N4 = 1.64769 | v4 = 33.8 |
| R8 = 5.669 | D8 = 0.44 | | |
| R9 = 8.438 | D9 = 0.95 | N5 = 1.77250 | v5 = 49.6 |
| R10 = 14.849 | D10 = variable | | |
| R11 = −14.849 | D11 = 0.95 | N6 = 1.77250 | v6 = 49.6 |
| R12 = −8.438 | D12 = 0.44 | | |
| R13 = −5.669 | D13 = 0.67 | N7 = 1.64769 | v7 = 33.8 |
| R14 = 15.623 | D14 = 0.16 | | |
| R15 = 21.342 | D15 = 1.96 | N8 = 1.77250 | v8 = 49.6 |
| R16 = −7.847 | D16 = 0.10 | | |
| R17 = 6.268 | D17 = 2.40 | N9 = 1.64769 | v9 = 33.8 |
| R18 = 5.368 | D18 = variable | | |
| R19 = 28.949 | D19 = 1.92 | N10 = 1.60311 | v10 = 60.7 |
| R20 = ∞ | | | |

Data of variable gaps

| | Image magnification 1.0× | Image magnification 0.5× |
|---|---|---|
| D2 | 20.13 | 33.29 |
| D10 | 7.33 | 0.76 |
| D18 | 20.13 | 13.55 |
| Effective $F_{NO}$ | 2.8 | — |

FIGS. 3A–3D and 4A–4D are aberration diagrams of the first optical system 2 in the present embodiment. FIGS. 3A–3D are aberration diagrams for image formation at magnification of 0.5, while FIGS. 4A–4D aberration diagrams for image formation at magnification of 1. In the aberration diagrams, d-line represents the Fraunhofer d-line, S.C a degree of how much the sine condition is not satisfied, S a position of sagittal image plane, M a position of meridional image plane, and Y' the image height on the primary image plane 30.

Figure 5A:
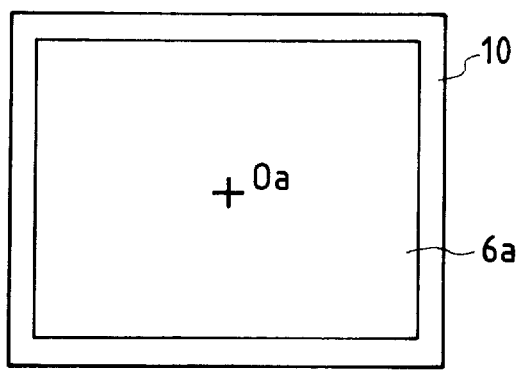
Figure 5B:
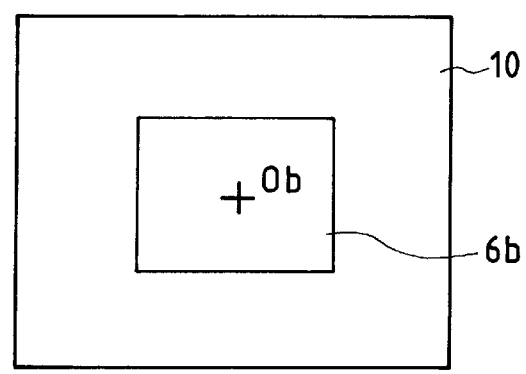

FIGS. 5A and 5B are conceptual drawings of images visually recognized by the observer in the present embodiment. When the observer looks ahead with the displaying apparatus mounted, the observer visually recognizes the virtual display image in a display range 6a in a view 10 of the external field as shown in FIG. 5A in case of the first optical system 2 being in image formation at magnification of 1; the observer visually recognizes a demagnified display range 6b as shown in FIG. 5B in case of the first optical system 2 being in image formation at magnification of 0.5, In case of the displaying apparatus of the present embodiment, the observer arbitrarily sets the size of the virtual display image in the external field 10 at need. For example, when the observer wants to concentrate on looking at the virtual display image, the observer can visually recognize the virtual display image on a preponderant basis by enlarging the virtual display image and visually recognizing it in the state of FIG. 5A; or when the observer wants to concentrate on observing the external field, the observer can readily look at the external field by demagnifying the virtual display image and virtually recognizing it in the state of FIG. 5B.

Figure 6:
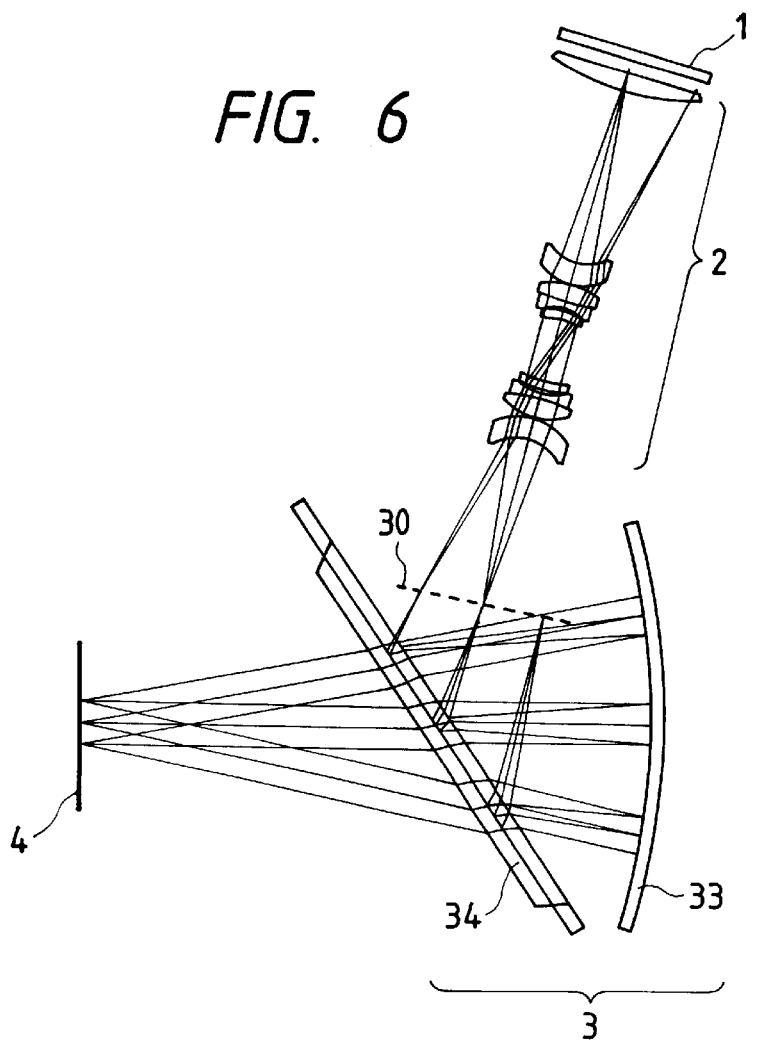
FIG. 6 is a schematic drawing to show an optical system in Embodiment 2 of the present invention.

FIG. 6 is a schematic drawing to show the optical system in Embodiment 2 of the present invention. The present embodiment is constructed in the same arrangement as Embodiment 1 of FIG. 1 except that the second field lens 24 in the first optical system 2 and the relay optical system (31, 32) in the second optical system 3 are omitted and that the image of image information formed on the primary image plane 30 by the first field lens 21 and the magnification-changing optical system (magnification-changing portion) 2a is enlarged by the eyepiece optical system (33, 34) to form an enlarged, virtual image thereof ahead the observer.

In the present embodiment, the observer also observes the enlarged, virtual image (virtual display image) of image information displayed on the image display device as well as the scene in the external field, similarly as in Embodiment 1.

Since the present embodiment is so arranged that the second optical system 3 is composed of only two mirrors, the present embodiment achieves the image displaying apparatus particularly light in weight and compact in size.

Figure 7:
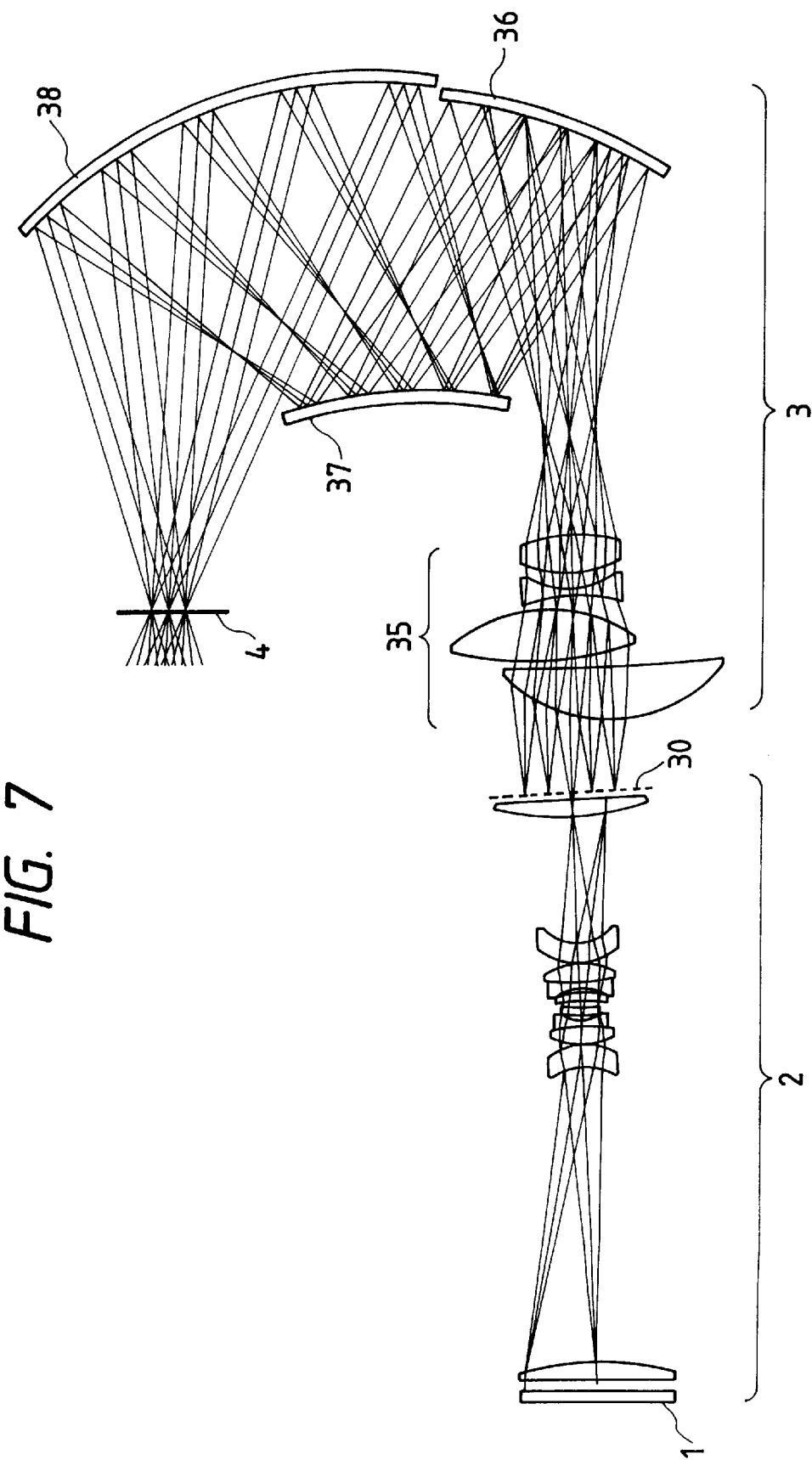
FIG. 7 is a schematic drawing to show an optical system in Embodiment 3 of the present invention.

FIG. 7 is a schematic drawing to show the optical system in Embodiment 3 of the present invention. The present embodiment is substantially the same as Embodiment 1 of FIG. 1 except that the relay optical system (35, 36, 37) and eyepiece optical system 38 composing the second optical system 3 are different from those in Embodiment 1.

In the second optical system 3, the relay lens 35 is a decentering optical system, which well corrects aberrations across a wide field. Numerals 36 and 37 designate curved mirrors, and the relay lens 35 and curved mirrors 36, 37 compose the relay optical system. Numeral 38 denotes a semitransparent, curved mirror, and the curved mirror 38 composes the eyepiece optical system. Light beams from the primary image plane 30 pass through the relay lens 35, thereafter are reflected by the two curved mirrors 36 and 37 toward the curved mirror 38, and then are reflected and collimated by the curved mirror 38 to enter the observer's pupil 4. Further, light from the external field passes through the curved mirror 38 to reach the observer's pupil 4. The curved mirror 38 is a beam combiner for superimposing an enlarged, virtual image of image information on a scene in the external field. In the above arrangement, the observer observers the enlarged, virtual image (virtual display image) of the image information displayed on the image display device 1 as well as the scene in the external field.

Since the present embodiment employs only one semitransparent mirror, it has such a feature that the virtual display image and the external field look brighter.

Figure 8:
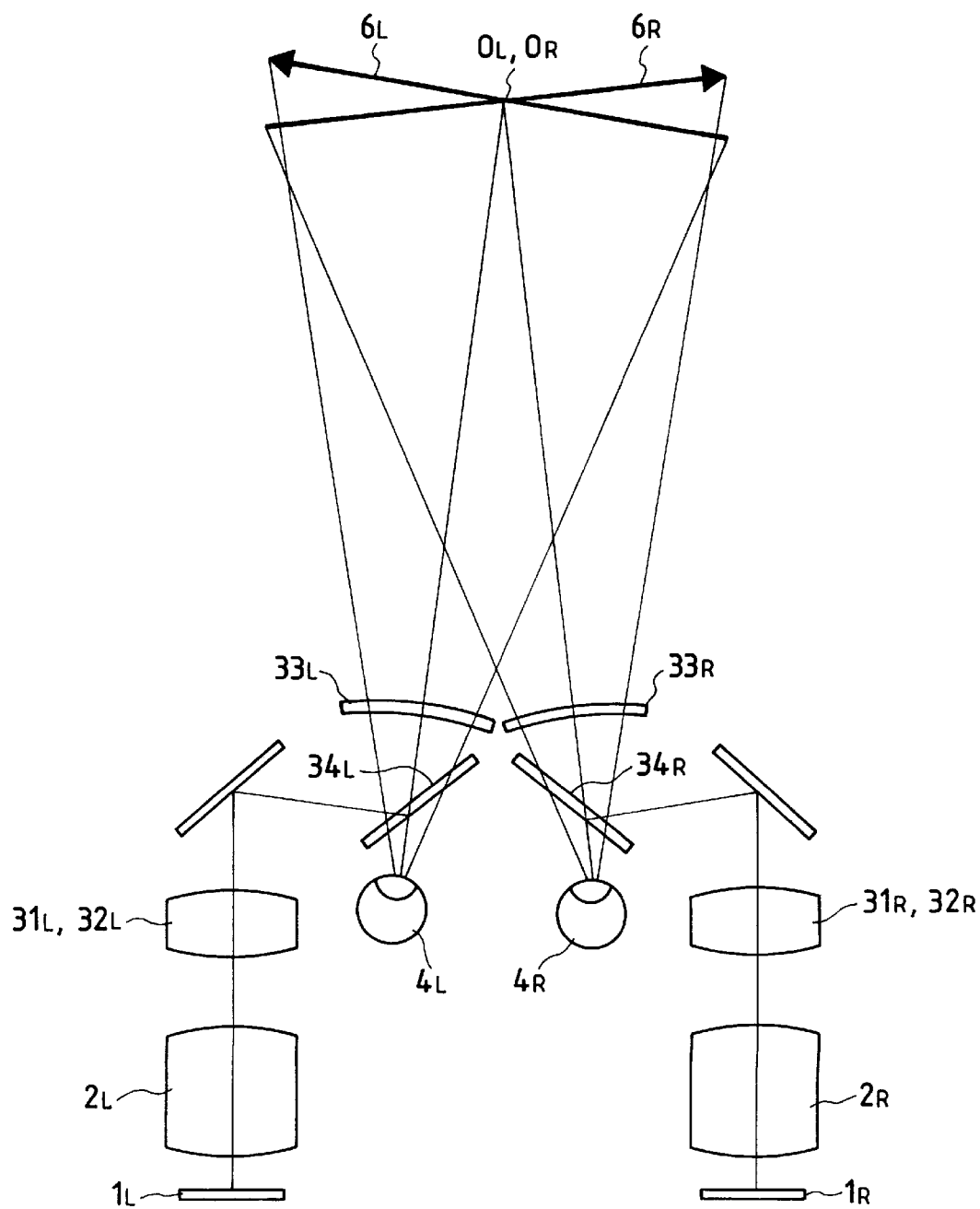
FIG. 8 is a schematic drawing to show a major part of Embodiment 4 of the present invention.

FIG. 8 is a schematic drawing to show the major part of Embodiment 4 of the present invention. The present embodiment is a multi-eye type image displaying apparatus constructed in such an arrangement that the image displaying apparatus of Embodiment 1 is set for each of the left and right eyes of the observer and that screen centers $0_L$, $0_R$ of virtual images $6_L$, $6_R$ are made coincident with each other. (Hereinafter, elements for the left eye and elements for the right eye are denoted with subscripts L, R, respectively.)

Figure 9A:
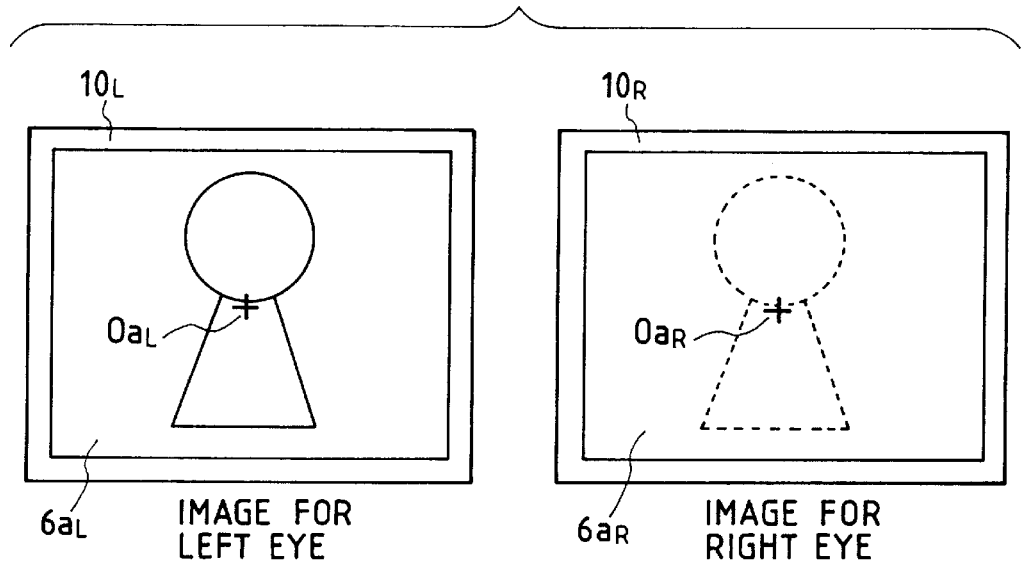
Figure 9B:
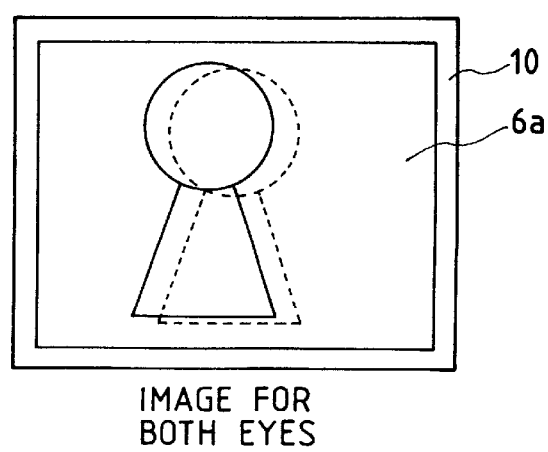
Figure 10A:
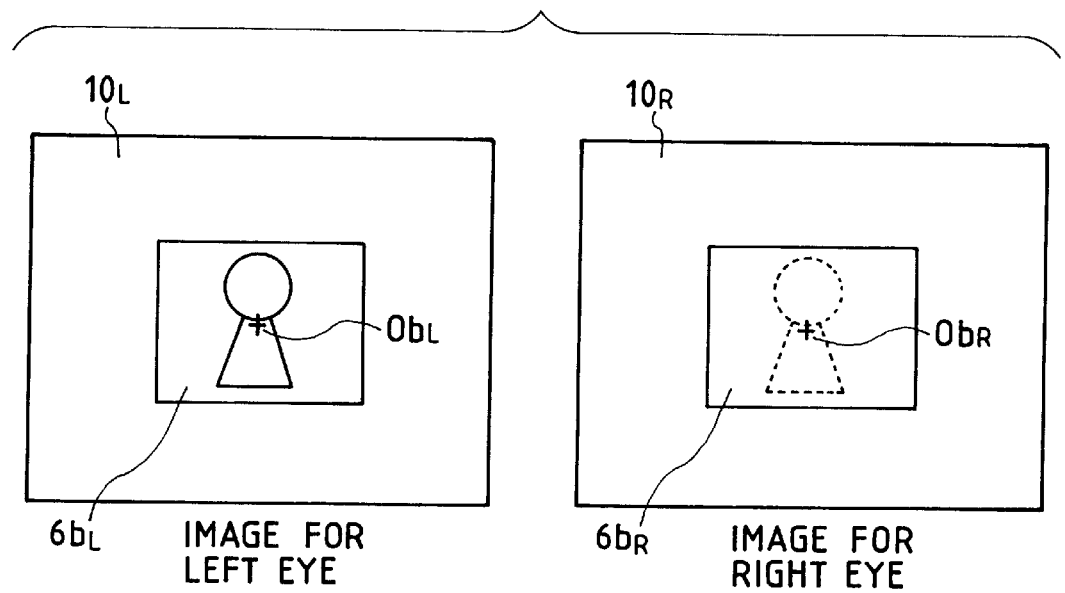
Figure 10B:
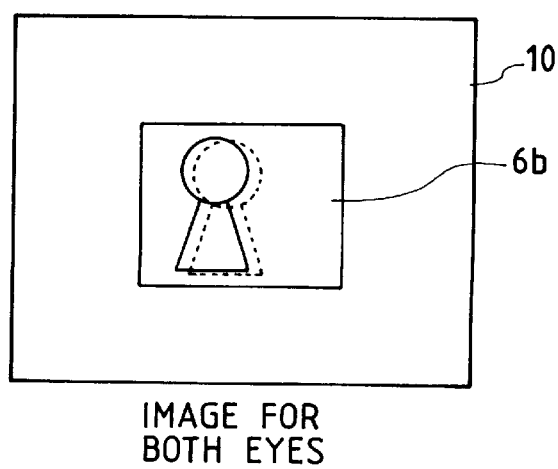

By the present embodiment, the observer observes the scene in the external field at the same time as observing a stereo image (3D image) using image information of a stereo pair displayed on the two image display devices $1_L$, $1_R$ (image information with parallax). FIGS. 9A, 9B and FIGS. 10A, 10B are explanatory drawings of 3D images in the present embodiment. FIGS. 9A, 9B are explanatory drawings to show a case in which the image magnification of the first optical system 2 is 1, while FIGS. 10A, 10B are explanatory drawings to show a case in which the image magnification is 0.5.

FIG. 9A shows images displayed in front of the left and right eyes. The left and right, virtual display images are displayed as $6a_L$ and $6a_R$, respectively, in display areas of external fields $10_L$, $10_R$. When these virtual display images are observed through the both eyes, the observer visually recognizes a virtual display image $6a$ as a 3D image in the external field 10 as shown in FIG. 9B. FIGS. 10A, 10B are explanatory drawings for image magnification of 0.5. As shown in FIG. 10A, images displayed in front of the left and right eyes are left and right, virtual display images displayed as $6b_L$, $6b_R$ in the external fields $10_L$, $10_R$ as shown in FIG. 10A. Observing them through the both eyes, the observer visually recognizes a virtual display image $6b$ as a 3D image in the external field 10 as shown in FIG. 10B. In this case, the display range of virtual display image is half in width and length as compared to the case of FIG. 9A.

Accordingly, in case of the displaying apparatus of the present embodiment, when the observer wants to preponderantly look at the virtual display image, the observer can visually recognize the virtual display image as a large 3D image on a preponderant basis by enlarging the virtual display image; or when the observer wants to preponderantly look at the external field, the observer can readily visually recognize the external field while observing the virtual display image as a demagnified 3D image.

Figure 11:
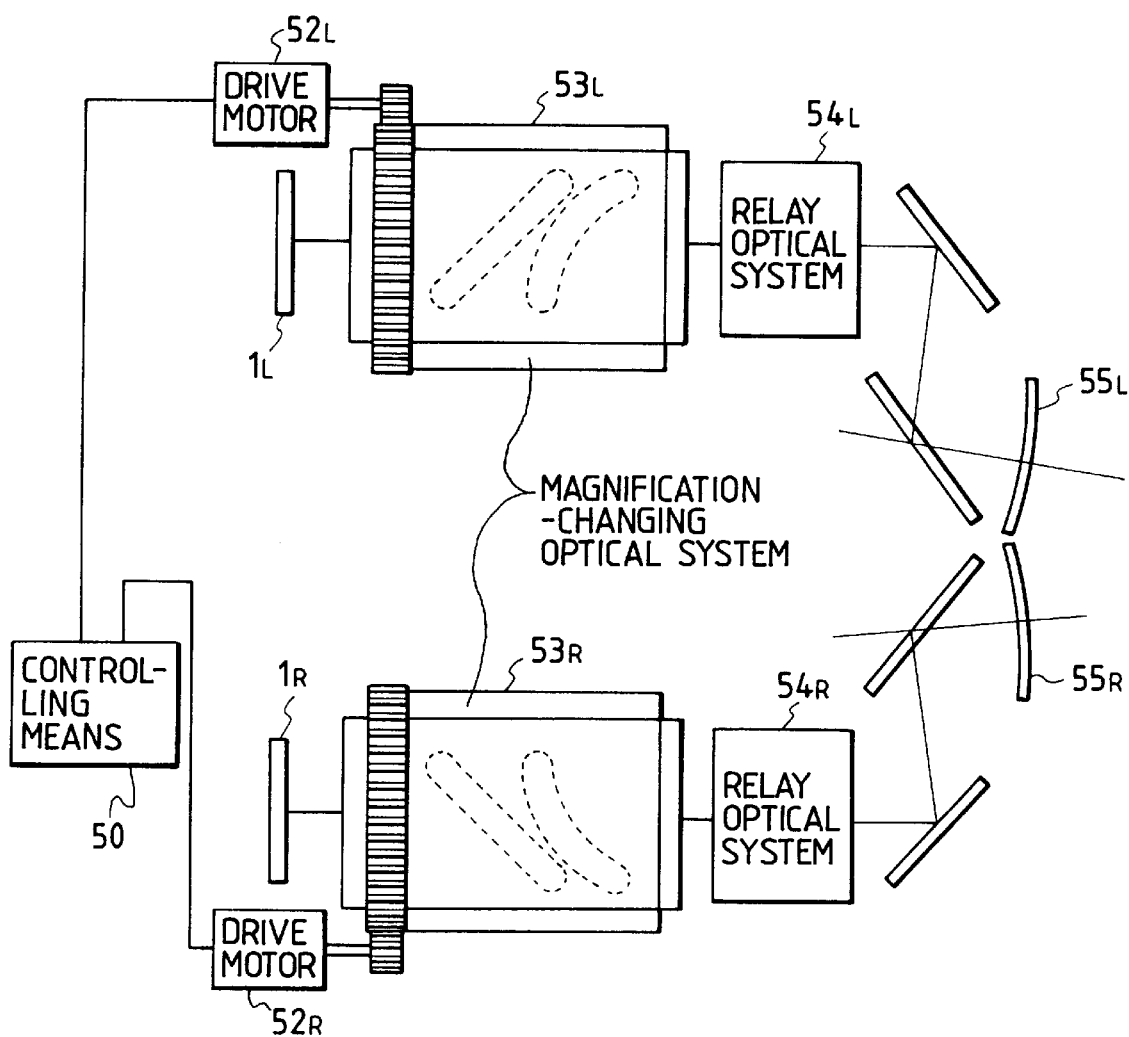
FIG. 11 is a schematic drawing of a major part of a magnification-change driving portion in Embodiment 4.
Figure 12:
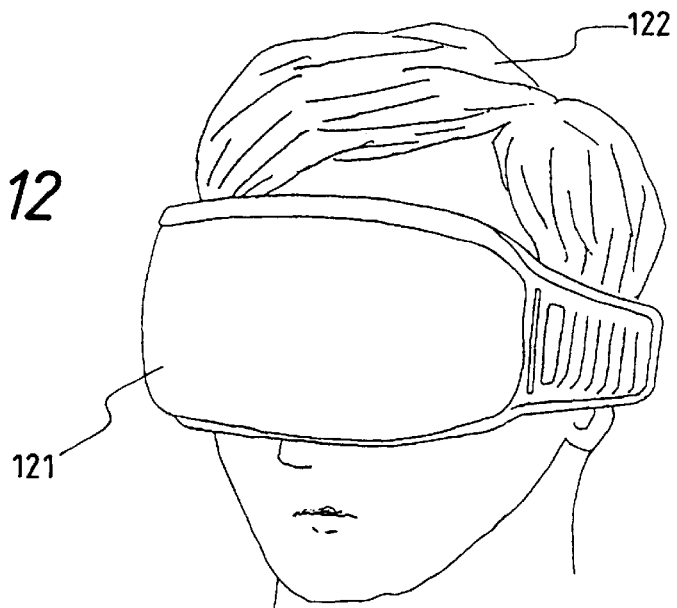
FIG. 12 is an explanatory drawing to show Embodiment 4 mounted on the head.

FIG. 11 is a schematic drawing to show the major part of a magnification-changing drive portion in Embodiment 4. In the drawing, $1_L$, $1_R$ are image display devices, and $53_L$, $53_R$ are magnification-changing optical systems (each composed of a plurality of magnification-changing partial systems) in the first optical systems 2 each mounted in a lens barrel. Symbols $52_L$, $52_R$ designate magnification-changing drive motors, each of which moves the magnification-changing optical system 53 mounted in the lens barrel on the optical axis to change the magnification. Further, $54_L$, $54_R$ are the relay optical systems in the second optical systems, and $55_L$, $55_R$ are the eyepiece optical systems in the second optical systems. Numeral 50 denotes a magnification-change controlling means, which controls the magnification-changing drive motors $52_L$, $52_R$ to change the image magnifications of the optical systems corresponding to the observer's left and right eyes and at the same time to make the image magnifications of the left and right optical systems approximately coincident with each other. In the present embodiment, each of the magnification-change controlling means 50, magnification-changing drive motors $52_L$, $52_R$, etc. is an element in the moving means for the magnification-changing partial systems. The present embodiment is arranged to control the left and right magnification-changing drive motors $52_L$, $52_R$ with pulse signals from the magnification-change controlling means 50, but the apparatus may be arranged to mechanically synchronize the pair of left and right magnification-changing optical systems $53_L$, $53_R$. FIG. 12 is a drawing to show the displaying apparatus 121 of the present embodiment mounted on the head 122 of observer.

In Embodiment 4 the multi-eye type image displaying apparatus is constructed using a pair of the displaying apparatus of Embodiment 1 of the present invention, but similar multi-eye type image displaying apparatus may be constructed using Embodiment 2 or 3 of the present invention, which can exhibit the same effects as Embodiment 4.

Figure 13:
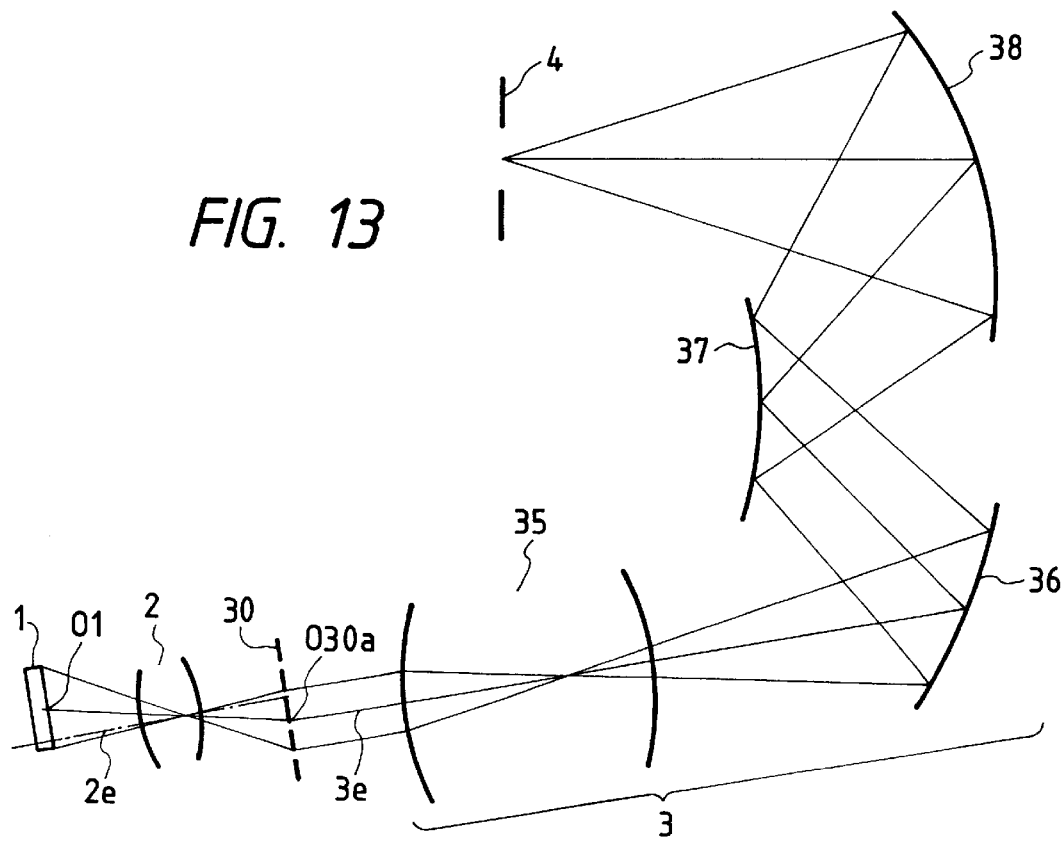
FIG. 13 is a schematic drawing to show an optical system in Embodiment 5 of the present invention.

FIG. 13 is a schematic drawing to show the optical system in Embodiment 5 of the present invention. Reference numeral 1 designates the image display device, which is a transmission-type liquid crystal display device in the present embodiment. Numeral 2 denotes the first optical system, which is a magnification-changing optical system for primarily forming an image of image information displayed on the image display device 1 on the primary image plane 30. Numeral 3 is the second optical system, which forms an enlarged, virtual image of the image of image information formed on the primary image plane 30, ahead the observer and which guides light from the primarily formed image to the observer's pupil 4. The optical system of the present embodiment is basically the same as in Embodiment 3 of FIGS. 3A to 3D except that the center 01 of the display surface of the image display device 1 is offset relative to the optical axis 2e of the first optical system 2 and that the optical axis 3e of the second optical system 3 is offset relative to the optical axis 2e. The optical axis 3e is so arranged as to pass a point 030a where the center 01 of display surface of the image display device 1 is primarily focused when the image magnification of the first optical system 2 is maximum.

Figure 14:
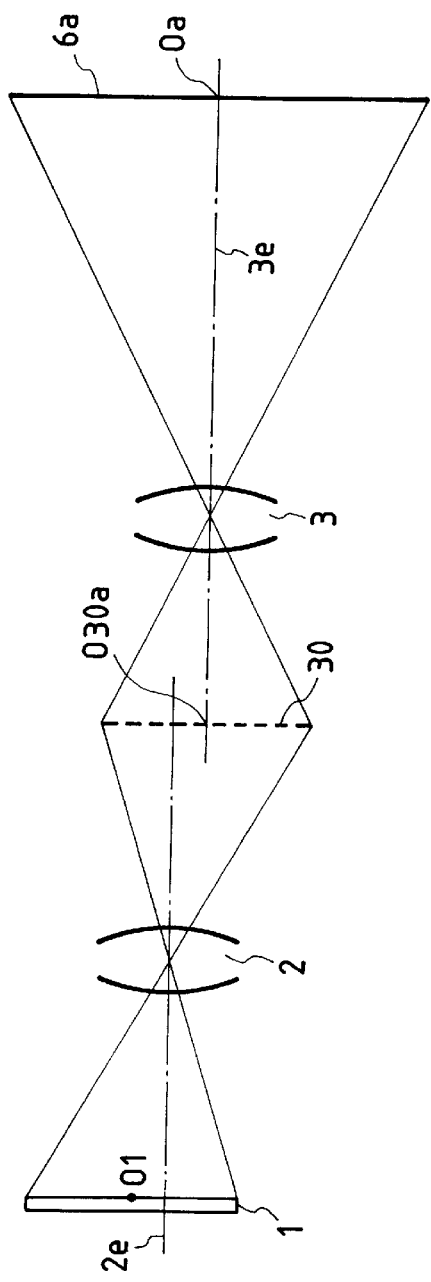
FIG. 14 is an explanatory drawing to illustrate the operation of Embodiment 5 (for image formation at magnification of 1)
Figure 15:
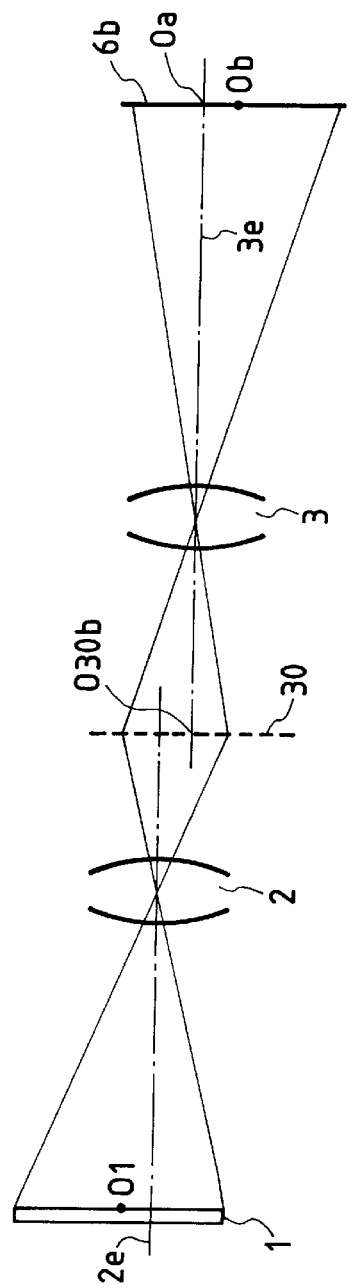
FIG. 15 is an explanatory drawing to illustrate the operation of Embodiment 5 (for image formation at magnification of 0.5)

The operation of this decentering optical system is next described. FIG. 14 and FIG. 15 are drawings to illustrate the operation of the present embodiment. FIG. 14 is an explanatory drawing to show a case in which the image magnification of the first optical system 2 is maximum (1) while FIG. 15 is an explanatory drawing to show a case in which the image magnification of the first optical system 2 is minimum (0.5). For convenience of illustration, a final image 6, which is originally to be a virtual image, is illustrated as a real image, but the observer observes this image 6 as a virtual image. In the case of FIG. 14, the first optical system 2 primarily forms an image of the decentering image display device 1 at a magnification of 1, and the point 030a of primary image formation of the center 01 of display surface is formed on the optical axis 3e of the second optical system 3. When the image magnification of the first optical system 2 is changed to 0.5, the primary image-forming point of the display surface center 01 moves to between the optical axis 2e and the optical axis 3e on the primary image plane 30, as shown in FIG. 15. Accordingly, the center 0b of the final image 6b is formed at the position as illustrated, thus deviating downward in the drawing from a position 0a of the center for image formation at magnification of 1.

Figure 16A:
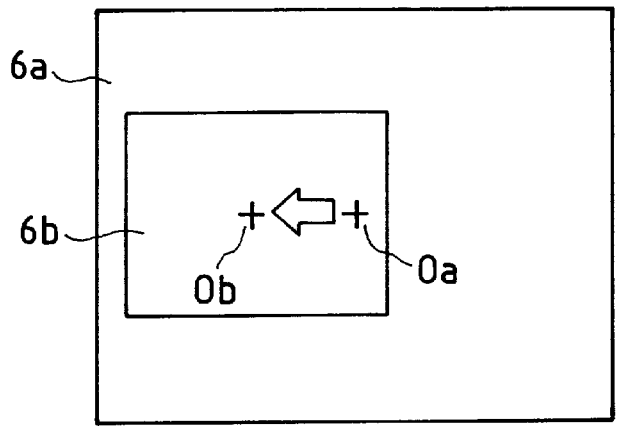
FIGS. 16A, 16B, and 16C are explanatory drawings of virtual display image in Embodiment 5.
Figure 16B:
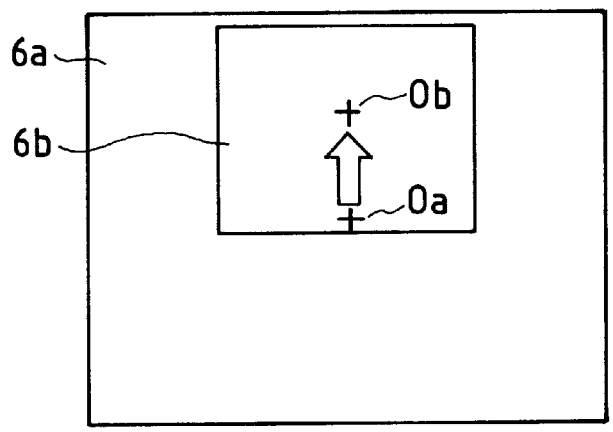
Figure 16C:
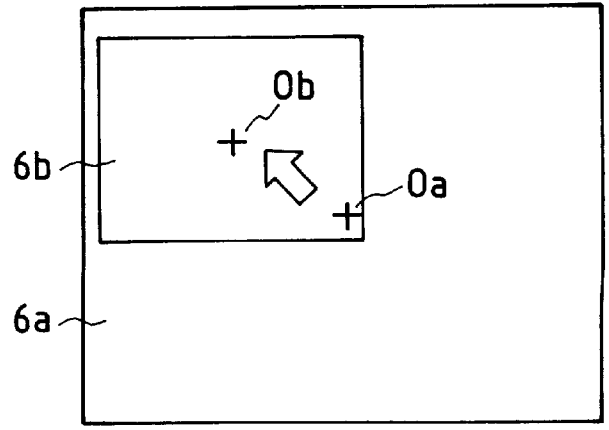

Thus, in case of the present embodiment, when the image magnification of the first optical system 2 is changed, the size of the virtual display image formed changes and the image center position of the virtual display image, i.e., the virtual image center position also moves. A direction of movement of the center position is a direction connecting the center 01 of display surface of the image display device 1 with the optical axis 2e. When the virtual display image 6a in the state of FIG. 14 is subjected to magnification change by the first optical system 2 so as to decrease the size thereof to the virtual display image 6b as shown in FIGS. 16A to 16C, the center of the image moves depending upon the direction connecting the display center 01 with the optical axis 2e, as shown in FIG. 16A, 16B, or 16C.

Figures 17A, 17B:
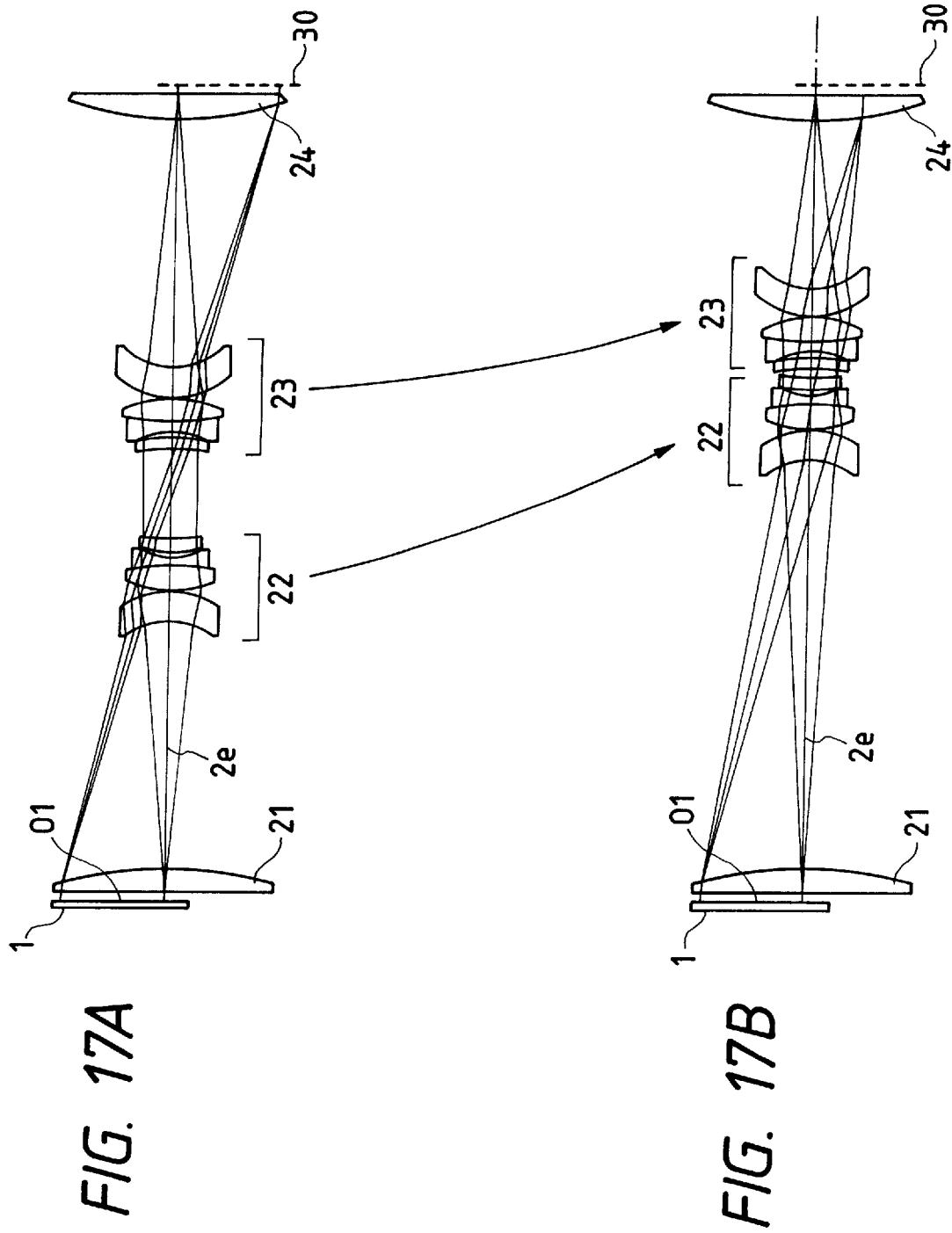

FIGS. 17A and 17B are optical system cross sections of the first optical system 2 in Embodiment 5. The optical system is substantially the same as the first optical system 2 in Embodiment 1 except that the display surface center 01 of the image display device 1 is offset from the optical axis 2e.

FIGS. 18A, 18B and FIGS. 19A, 19B are explanatory drawings of images by Embodiment 6 of the present invention. Embodiment 6 is a multi-eye type image displaying apparatus arranged in such a manner that the displaying apparatus of Embodiment 5 is arranged to move the virtual image center downward upon demagnifying the virtual image with magnification change, that such display apparatus is provided for each of the left and right eyes of the observer, and that screen centers of virtual display images $6a_L$, $6a_R$ at the maximum magnification (i.e., when the image magnification of the first optical system is 1) are coincident with each other.

Figure 18A:
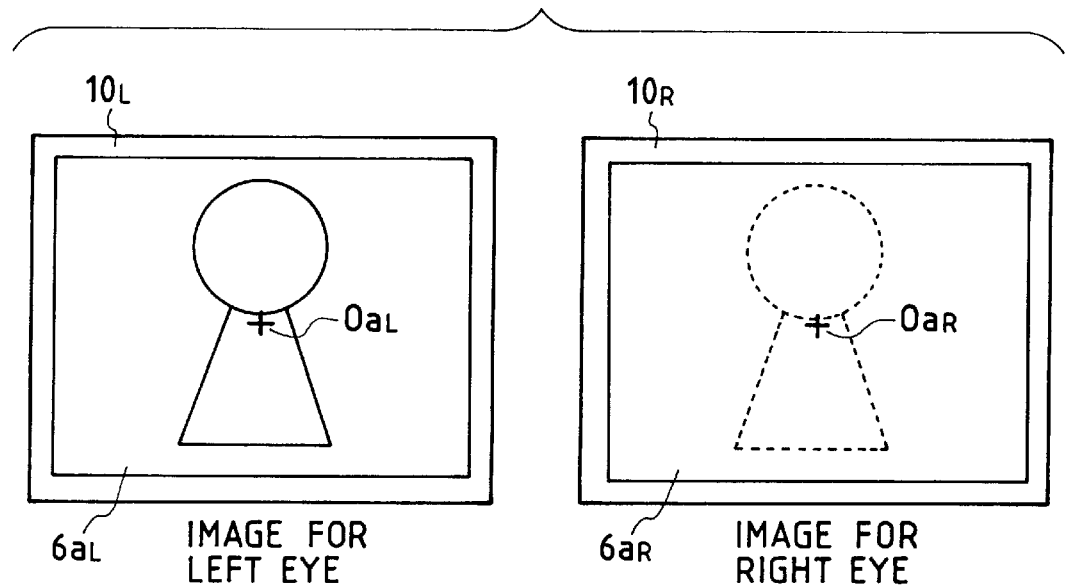
Figure 18B:
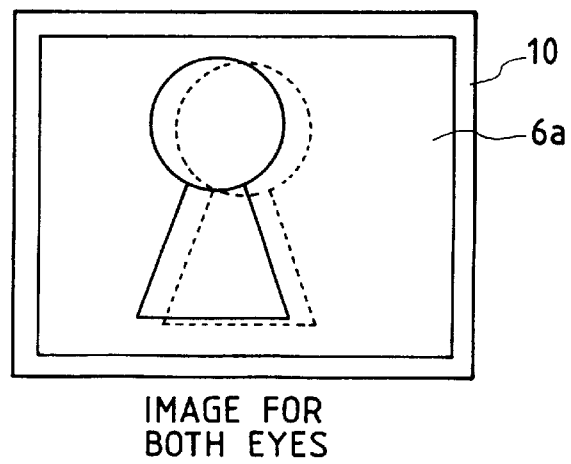
Figure 19A:
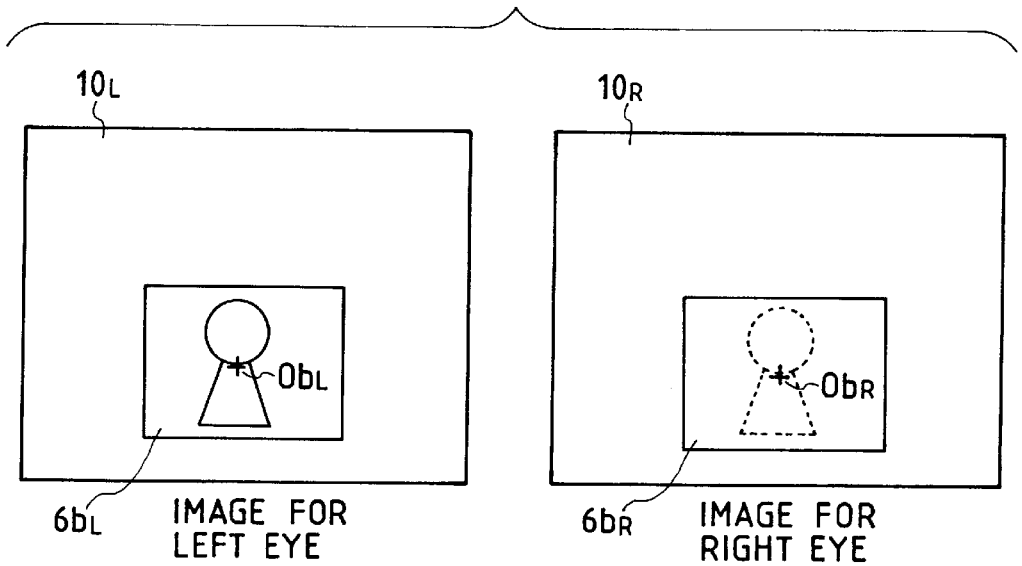
Figure 19B:
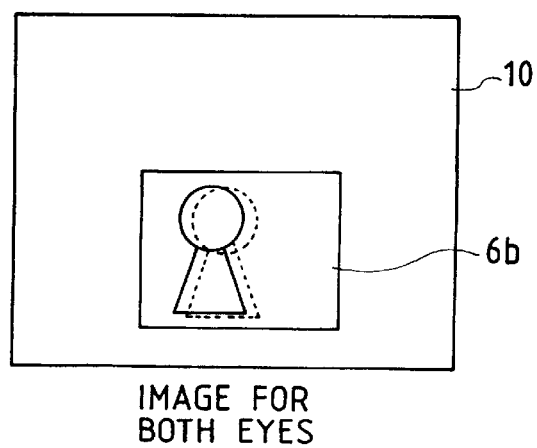

FIGS. 18A and 18B show a case in which the image magnification of the first optical system 2 is 1 (i.e., where the size of the virtual display images is maximum), while FIGS. 19A and 19B a case in which the image magnification of the first optical system 2 is 0.5 (i.e., where the size of the virtual display images is minimum). FIG. 18A is an explanatory drawing of images displayed in front of the left and right eyes. In the drawing, $10_L$ and $10_R$ represent the external field, in which the virtual display images $6a_L$ and $6a_R$ are observed. Observing the two virtual display images through the both eyes, the observer visually recognizes a large, virtual display image 6a as a 3D image in the external field 10, as shown in FIG. 18B.

FIG. 19A is an explanatory drawing of images displayed in front of the left and right eyes for image magnification of 0.5. Virtual display images $6b_L$ and $6b_R$ each are formed in lower parts of field in the external fields $10_L$ and $10_R$. Observing the two virtual images through the both eyes, the observer visually recognizes a small, virtual display image 6b as a 3D image in a lower part of the external field 10, as shown in FIG. 19B.

The present embodiment achieves such a displaying apparatus that when the images on the image display devices 1 are desired mainly to look at, they can be visually recognized as a 3D image enlarged to a large screen and that when a state in the external field is desired preponderantly to look at, the size of the 3D image of virtual display image is decreased and the image is moved downward to the lower part of field, thus facilitating visual recognition of the external field.

Although stereoscopic vision is not limited to applications for the vertical movement of the virtual image center, the present structure is preferred especially because of little fatigue of observer's eyes when magnification-change manipulation is made while observing the 3D image.

Figure 20A:
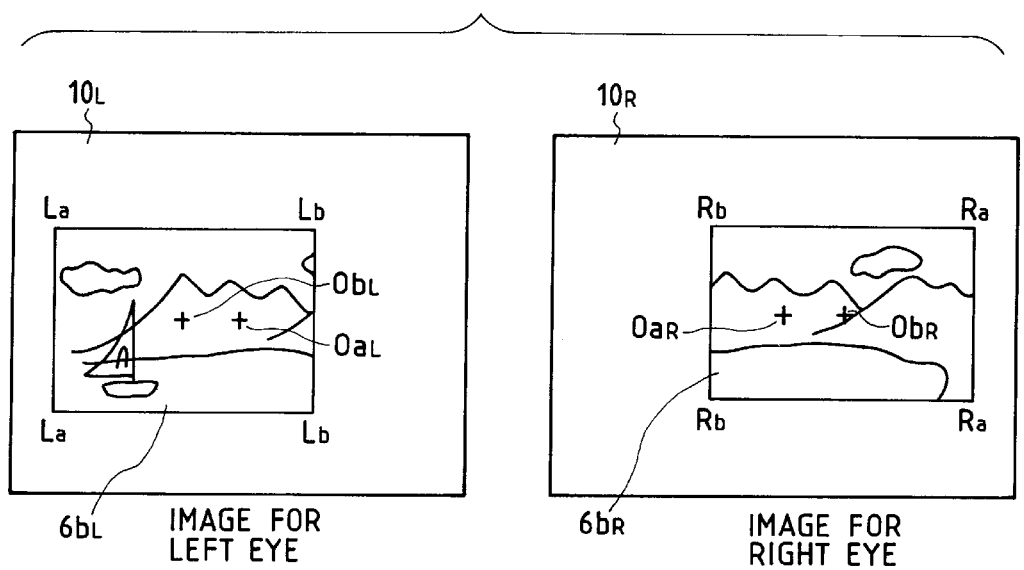
Figure 20B:
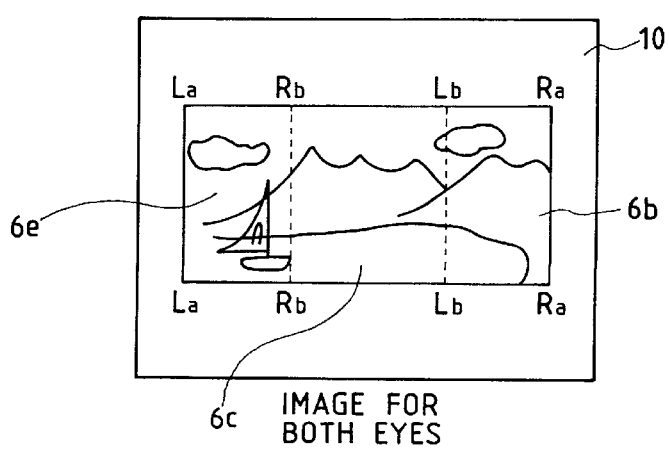

FIGS. 20A and 20B are explanatory drawings of images in Embodiment 7 of the present invention. The present embodiment is a multi-eye type displaying apparatus arranged in such a manner that the displaying apparatus of Embodiment 5 shown in FIG. 13 is arranged to move the virtual image centers horizontally outward (to the left in the left eye display system and to the right in the right eye display system) upon demagnifying the virtual images with magnification change, that such displaying apparatus is provided for each of the left and right eyes of the observer, and that screen centers $0a_L$ and $0a_R$ of two virtual images $6a_L$ and $6a_R$ displayed in a maximum size are made coincident with each other.

In the present embodiment, the observer visually recognizes a large, virtual display image as a 3D image as shown in FIG. 18B when the size of virtual display image 6 is maximum, that is, when the image magnification of the first optical system 2 is 1. FIGS. 20A and 20B show images when the image magnification of the first optical system 2 is changed to 0.5. In this case, as shown in FIG. 20A, the left-eye virtual display image $6b_L$ is made smaller in size and is shifted to the left in the field, and the right-eye virtual display image $6b_R$ is made smaller in size and is shifted to the right. In this case, left and right image information for a panorama scene is indicated on the image display devices $1_L$, $1_R$. Observing the virtual display images through the both eyes, the observer visually recognizes a so-called panorama image 6b horizontally elongated, in the external field 10, as shown in FIG. 20B. In this case, a range 6c of overlapping virtual image region between the two virtual display images is visually recognized as a 3D image, and ranges of regions 6d and 6e other than the range 6c as 2D images.

In each embodiment as described above the magnification-changing optical system was a two-component zoom system in which two magnification-changing components moved on the optical axis, but the magnification-changing optical system may be composed of three or more magnification-changing components. Also, the magnification-changing optical system may be either a system mainly having a demagnifying function or a system mainly having a magnifying function.

The above embodiments were arranged to simultaneously observe the external field and the enlarged, virtual image (virtual display image) of the image information displayed on the image display device(s), but the same structure may be applied to applications for observing only image information on the image display device(s) while permitting the observer to change the magnification of the virtual display image, to move the position of the virtual display image, or to observe an image different in aspect ratio of virtual display image. For example, for observing image information such as sports with quick motion, an effect to facilitate observation of the entire field can be achieved by decreasing the size of the virtual display image to some extent.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image displaying apparatus comprising:
    image displaying means for radiating light to display an image;
    a first optical system for forming said image on a primary image plane, which has a magnification-changing portion for changing an image magnification of said image, said magnification-changing portion having at least two magnification-changing partial systems relatively moving to each other on an optical axis of said first optical system; and
    a second optical system for guiding light from said primary image plane to the pupil of an observer in order to enable the observer to observe an enlarged, virtual image of the image formed on said primary image plane.

2. The apparatus according to claim 1, wherein said magnification-changing portion in the first optical system has a field lens located in front of said image displaying means.

3. The apparatus according to claim 1, wherein an exit pupil of said first optical system is approximately coincident with an entrance pupil of said second optical system.

4. The apparatus according to claim 1, wherein said second optical system has a beam combiner and said observer observes said enlarged, virtual image and an image of an external field in a superimposed manner through said beam combiner.

5. A multi-eye type image displaying apparatus comprising:
    two displaying devices for the left eye and the right eye of an observer, each having image displaying means for radiating light to display an image, a first optical system for forming said image on a primary image plane, which has a magnification-changing portion for changing an image magnification of said image, and a second optical system for guiding light from said primary image plane to the pupil of said observer in order to enable the observer to observe an enlarged, virtual image of the image formed on said primary image plane;
    wherein said each magnification-changing portion in the first optical system for the left eye or the right eye has at least two magnification-changing partial systems relatively moving to each other on an optical axis of each optical system and means for moving the respective magnification-changing partial systems and wherein said moving means move said magnification-changing portions in the first optical systems for the left eye and the right eye by a same amount.

6. The apparatus according to claim 5, wherein the images displayed by said image displaying means for the left eye and the right eye have parallax between them.

7. The apparatus according to claim 5, wherein the optical axes of said first optical systems each deviate from the centers of said images.

8. The apparatus according to claim 7, wherein the optical axes of said first optical systems each deviate from the optical axes of said second optical systems.

9. The apparatus according to claim 7, wherein deviations of the optical axes of said first optical systems for the left eye and the right eye from the centers of the images are horizontal, are opposite to each other in direction, and are same in amount.

10. The apparatus according to claim 5, wherein said second optical systems have a beam combiner and said observer observes said enlarged, virtual images and an image of an external field in a superimposed manner through said beam combiner.

* * * * *